(12) United States Patent
Wozniak

(10) Patent No.: US 7,605,565 B2
(45) Date of Patent: Oct. 20, 2009

(54) BATTERY PACK WITH PROTECTION CIRCUIT

(75) Inventor: John A. Wozniak, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1336 days.

(21) Appl. No.: 10/729,501

(22) Filed: Dec. 5, 2003

(65) Prior Publication Data

US 2005/0134227 A1 Jun. 23, 2005

(51) Int. Cl.
*H02J 7/00* (2006.01)

(52) U.S. Cl. .................. 320/134; 320/136; 320/149

(58) Field of Classification Search ............. 320/134, 320/136, 151, 137, 149, 161, 156, 162, 150
See application file for complete search history.

(56) References Cited

U.S. PATENT DOCUMENTS

| | | | |
|---|---|---|---|
| 4,315,364 A | 2/1982 | Leffingwell | |
| 5,534,788 A | 7/1996 | Smith et al. | |
| 5,557,188 A | 9/1996 | Piercey | |
| 5,602,460 A | 2/1997 | Fernandez et al. | |
| 5,703,463 A | 12/1997 | Smith | |
| 5,705,911 A | 1/1998 | Tamai | |
| 5,742,148 A | 4/1998 | Sudo et al. | |
| 5,783,322 A | 7/1998 | Nagai et al. | |
| 5,883,495 A | 3/1999 | Smith et al. | |
| 5,896,025 A | 4/1999 | Yamaguchi et al. | |
| 5,909,104 A | 6/1999 | Scott | |
| 5,963,019 A * | 10/1999 | Cheon | 320/150 |
| 6,046,575 A * | 4/2000 | Demuro | 320/134 |
| 6,060,185 A * | 5/2000 | Okutoh | 429/7 |
| 6,285,165 B1 * | 9/2001 | Terada | 320/134 |
| 6,392,387 B1 | 5/2002 | Sage et al. | |
| 6,492,791 B1 * | 12/2002 | Saeki et al. | 320/135 |
| 6,501,248 B2 * | 12/2002 | Fujiwara | 320/136 |
| 6,642,694 B2 | 11/2003 | Yamanaka et al. | |
| 6,804,100 B2 * | 10/2004 | Astala | 361/93.2 |
| 2003/0080747 A1 * | 5/2003 | Huelss | 324/426 |
| 2003/0117143 A1 * | 6/2003 | Okada | 324/428 |
| 2004/0062387 A1 * | 4/2004 | O'Connor | 379/412 |

* cited by examiner

*Primary Examiner*—Patrick J Assouad
*Assistant Examiner*—Alexis Boateng

(57) ABSTRACT

A battery pack comprises a protection circuit adapted to detect an excessive current consumption condition associated with electronic components forming the battery pack.

38 Claims, 1 Drawing Sheet

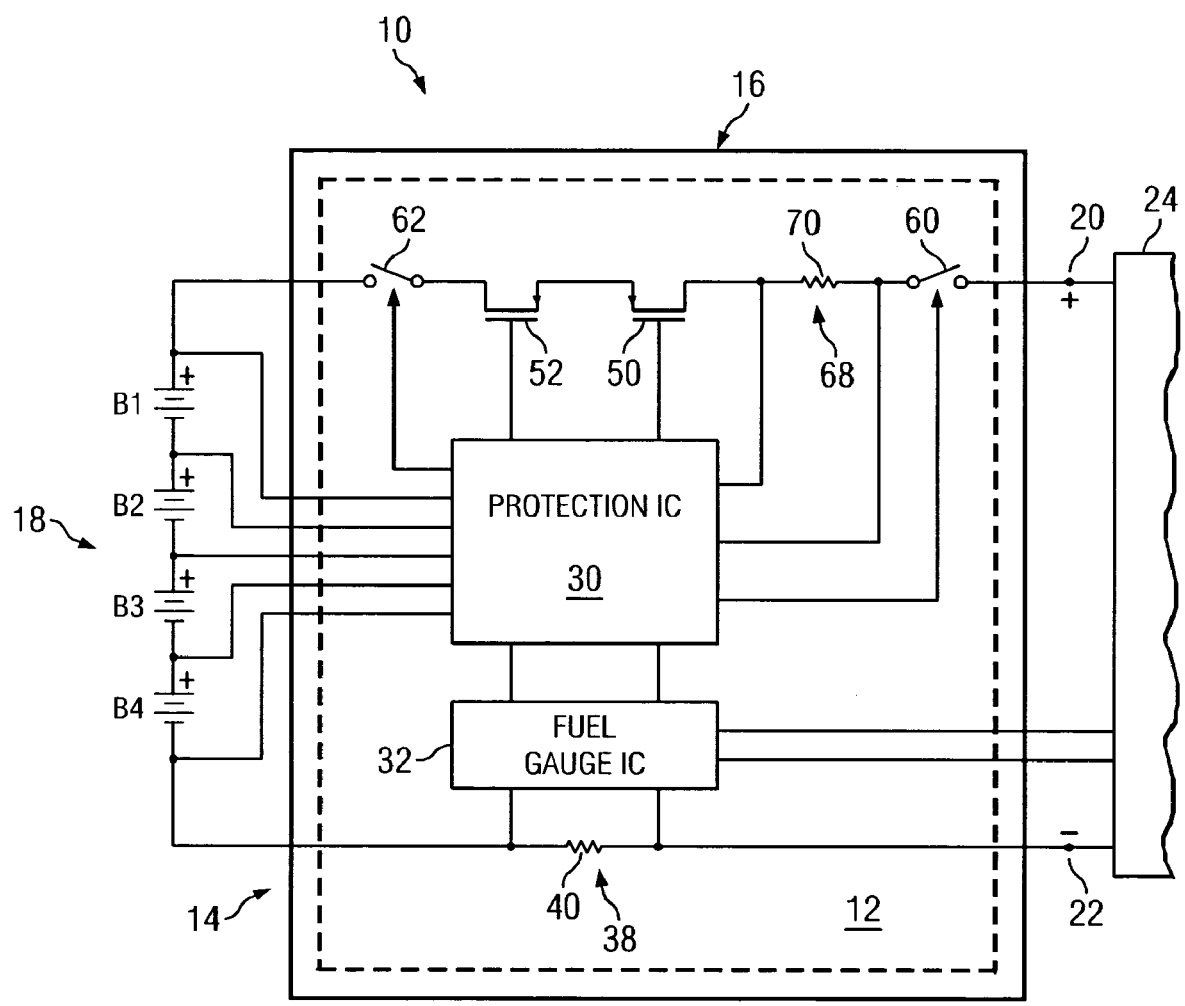

BATTERY PACK WITH PROTECTION CIRCUIT

TECHNICAL FIELD

This invention relates to battery packs and, more particularly, to a battery pack with protection circuit.

BACKGROUND

Battery packs are used in a variety of types of electronic devices such as radios, portable computers, telephones, and cameras. Rechargeable battery packs, such as lithium-ion, nickel-cadmium, nickel-metal hydride, and other types of rechargeable batteries, are favored by users over non-rechargeable batteries, such as alkaline batteries, to provide longer energy life, lighter weight, and less cost. However, rechargeable batteries are generally sensitive to overcharging, overdischarging, and/or exposure to excessive current loads. For example, contaminants in the battery pack, a loose or failed battery pack component, and/or an excess current load may cause an excessive thermal energy condition in the battery pack. The excessive thermal energy condition may also migrate to the cells of the battery pack, thereby posing a significant safety hazard.

SUMMARY

In accordance with an embodiment of the present invention, a battery pack comprises a protection circuit adapted to detect an excessive current consumption condition associated with electronic components forming the battery pack.

In accordance with another embodiment of the present invention, a battery pack comprises an integrated circuit adapted to compare potentials across at least two current sensors to detect an excessive current consumption condition associated with electronic components forming the battery pack.

In accordance with another embodiment of the present invention, a battery pack comprises a battery core pack connected to a positive terminal of the battery pack and a negative terminal of the battery pack where the positive and negative terminals are adapted to be connected to a host device. The battery pack also comprises a protection circuit adapted to distinguish between current consumption associated with electronic components forming the battery pack and current flow associated with the host device to determine whether an excessive current consumption condition exists associated with the electronic components of the battery pack.

BRIEF DESCRIPTION OF THE DRAWINGS

For a more complete understanding of the present invention, the objects and advantages thereof, reference is now made to the following descriptions taken in connection with the accompanying drawings in which:

The FIGURE is a block diagram of an embodiment of a battery pack with protection circuit in accordance with the present invention.

DETAILED DESCRIPTION OF THE DRAWINGS

The preferred embodiment of the present invention and its advantages are best understood by referring to the FIGURE of the drawings, like numerals being used for like and corresponding parts of the various drawings.

The FIGURE is a diagram illustrating an embodiment of a battery pack 10 with a protection circuit 12 in accordance with the present invention. Briefly, battery pack 10 with protection circuit 12 determines current consumption by battery pack 10 electronics and, if current consumption by battery pack 10 electronics exceeds a predetermined threshold, interrupts the current flow to battery pack 10 electronics. Protection circuit 12 interrupts current flowing to battery pack 10 electronics from either a battery core pack and/or an external power source, such as a recharging device, thereby substantially preventing or eliminating an excessive current flow through the electronics of battery pack 12 which may otherwise cause an excessive thermal energy condition or safety hazard. Thus, protection circuit 12 detects an excessive current consumption condition by electronic components of battery pack 10 caused by either current flowing from a battery core pack of battery pack 10 or an external host device, such as a recharging device.

In the embodiment illustrated in the FIGURE, battery pack 10 comprises a battery core pack 18 coupled to electronic components 14 of battery pack 10 such as, but not limited to, resistors, capacitors, transistors, fuses, protection circuit 12, a printed circuit board 16 and other integrated circuit (IC) components. For ease of description, the entirety of all possible electronic components 14 forming battery pack 10 is not illustrated in the FIGURE.

As illustrated in the FIGURE, battery pack 10 comprises a battery core pack 18 having a plurality of cells B1-B4. Battery core pack 18 may comprise a lithium-ion battery, a nickel-cadmium battery, a nickel-metal hydride battery, or any other type of rechargeable battery now known or later developed having a desired voltage and charge capacity for operating a particular electronic device. In the embodiment illustrated in the FIGURE, four battery cells B1-B4 are illustrated as being serially connected; however, it should be understood that a greater or fewer quantity of battery cells may be used and may be arranged in series and/or parallel configurations. As illustrated in the FIGURE, battery core pack 18 is disposed between a positive terminal 20 and a negative terminal 22 of battery pack 10 such that positive terminal 20 is coupled to a positive terminal of battery core pack 18 and negative terminal 22 is coupled to a negative terminal of battery core pack 18. Terminals 20,22 are also used to connect battery pack 10 to a host device 24 such as, but not limited to, a recharging device or an electronic device designed to operate based on power drawn from battery pack 10.

In the embodiment illustrated in the FIGURE, protection circuit 12 comprises a protection IC 30 and a fuel gauge IC 32. Fuel gauge IC 32 monitors the amount power or current flowing in and/or out of battery pack 10 via a current sensor 38. Fuel gauge IC 32 may also communicate with host device 24 to indicate battery pack 10 capacity and communicate other types of information relating to battery pack 10 to host device 24. Fuel gauge IC 32 may employ any of a variety of techniques to measure the power or current flowing in and/or out of battery pack 10. In the embodiment illustrated in the FIGURE, current sensor 38 comprises a current sense resistor 40 is used by fuel gauge IC 32 to determine the current flow in and/or out of battery pack 10 by measuring the voltage drop or potential across resistor 40. Thus, in the illustrated embodiment, fuel gauge IC 32 determines the current flow associated with host device 24 and the current flow associated with electronic components 14 of battery pack 10 by measuring the potential across resistor 40.

In the embodiment illustrated in the FIGURE, fuel gauge IC 32 is also coupled to protection IC 30 to enable information an/or power communication between fuel gauge IC 32 and protection IC 30. In some embodiments, fuel gauge IC 32 is coupled to protection IC 30 to provide one or more failsafe mechanisms, e.g., battery pack 10 may be configured such that fuel gauge IC 32 is powered by protection IC 30. Thus, in the event of a failure of protection IC 30, fuel gauge IC 32 becomes disabled. Additionally, in some embodiments, protection IC 30 may detect a failure of fuel gauge IC 32 and disable battery pack 10. Further, as will be described below, functions and/or logic associated with protection circuit 12 may be disposed within or form part of protection IC 30 and/or fuel gauge IC 32 such that an overcurrent consumption event associated with electronic components 14 forming battery pack 10 may be detected and interrupted.

In the embodiment illustrated in the FIGURE, protection IC 30 is coupled to serially-connected charge/discharge metallic oxide semiconductor field effect transistors (MOSFETs) 50, 52, respectively, to control current flow in and/or out of battery core pack 18. For example, MOSFET 50 is operable as a discharge control switch while MOSFET 52 is operable as a charge control switch. In the FIGURE, MOSFETS 50,52 are connected in series between a positive terminal of battery core pack 18 and terminal 20. Thus, protection IC 30 provides on/off switch control of MOSFETS 50,52 to enable/disable current flow in either direction relative to battery core pack 18.

In the FIGURE, the illustrated embodiment of protection circuit 12 also comprises a fuse 60 coupled in series between MOSFET 50 and terminal 20, a fuse 62 coupled in series between a positive terminal of battery core pack 18 and MOSFET 52, and a current sensor 68. Fuses 60 and 62 are selected to open to interrupt a current flow in the event of an overcurrent and/or overtemperature condition. Fuses 60,62 are also illustrated as being coupled to protection IC 30 such that protection IC 30 may transmit a signal to fuses 60,62 to open or blow fuses 60,62. As will be described below, logic may be stored in protection IC 30 and/or fuel gauge IC 32 to open fuse 60 and/or 62 to interrupt current flow to and/or from host device 24 and interrupt current flow within battery pack 10.

In the embodiment illustrated in the FIGURE, protection circuit 12 measures the current flow to and/or from host device 24 via current sensor 68. Protection circuit 12 may employ any of a variety of techniques to measure the power flowing to and/or from host device 24. In the embodiment illustrated in the FIGURE, current sensor 68 comprises a current sense resistor 70 coupled in series between MOSFET 50 and terminal 20 to determine the current flow to and/or from host device 24 by measuring the voltage drop or potential across resistor 70. In the FIGURE, protection IC 30 is illustrated as connected to each end of resistor 70 to measure the voltage drop across resistor 70. However, it should be understood that fuel gauge circuit 32 may be used to measure the voltage drop across resistor 70. Additionally, in the FIGURE, resistor 70 is illustrated as being disposed between fuse 60 and MOSFET 50; however, it should be understood that resistor 70 may be otherwise located relative to fuse 60.

In operation, logic and/or a comparator circuit resides on protection IC 30 and/or fuel gauge IC 32 to compare the voltage drops or potentials across resistors 40 and 70 to determine whether an excessive current consumption condition exists with respect to battery pack 10 electronic components 14. For example, the voltage drop across resistor 70 reflects or indicates a combined current flow based on the current flow to and/or from host device 24 and the current flow associated with electronic components 14 of battery pack 10. The voltage drop across resistor 70 reflects or indicates the current flow to and/or from host device 24. Thus, by using a comparator circuit and/or logic residing on protection IC 30 and/or fuel gauge IC 32, a comparison or subtraction of the voltage drop values across resistors 40 and 70 is performed to determine the current flow consumption associated with electronic components 14 of battery pack 10. If the current flow consumption associated with electronic components 14 of battery pack 10 exceeds a predetermined threshold, logic residing on protection IC 30 and/or fuel gauge IC 32 causes fuses 60 and/or 62 to open, thereby interrupting a particular current flow. Preferably, protection circuit 12 is configured to open both fuses 60,62 if an overcurrent consumption condition exists for electronic components 14 of battery pack 10 such that current flow is interrupted from both host device 24, such as during a recharging operation, and battery core pack 18. However, it should be understood that protection circuit 12 may also be configured to open either fuse 60 or fuse 62 to interrupt current flow from either host device 24 or battery core pack 18, respectively.

Battery pack 10 may also be configured to enable current flow interruption externally, e.g., by user intervention. For example, in some embodiments, battery pack 10 may be configured to generate an alert or signal of the overcurrent consumption condition. The alert or signal may be in the form of a user-presentable signal to enable a user to interrupt current flow by, for example, disconnecting a recharging device. The alert or signal may also be communicated directly to a recharging device such that the recharging device automatically ceases recharging operations.

Thus, embodiments of the present invention detect an overcurrent consumption condition associated with electronic components 14 of battery pack 10. If an overcurrent consumption condition associated with electronic components 14 of battery pack 10 is detected, protection circuit 12 interrupts current flow within battery pack 10 to substantially prevent or eliminate excessive thermal conditions within battery pack 10 caused by current flowing through battery pack 10.

What is claimed is:

1. A battery pack, comprising:
a protection circuit adapted to distinguish between current flow associated with a host device and current consumption associated with electronic components forming the battery pack and detect an excessive current consumption condition associated with the electronic components forming the battery pack.

2. The battery pack of claim 1, wherein the protection circuit is adapted to interrupt current flow to the electronic components forming the battery pack in response to detecting the excessive current consumption condition.

3. The battery pack of claim 1, wherein the protection circuit is adapted to compare a voltage potential across at least two different current sensors to detect the excessive current consumption condition.

4. The battery pack of claim 1, wherein the protection circuit is adapted to interrupt current flowing from the host device to the electronic components.

5. The battery pack of claim 1, wherein the protection circuit is adapted to interrupt current flowing from a battery core pack to the electronic components.

6. The battery pack of claim 1, further comprising at least one fuse serially connected to a battery core pack for interrupting current flowing from the battery core pack to the electronic components.

7. The battery pack of claim 1, further comprising at least one fuse serially connected to the host device for interrupting current flowing from the host device to the electronic components.

8. The battery pack of claim 1, wherein the protection circuit comprises a fuel gauge integrated circuit adapted to determine a combined current flow associated with the host device and the electronic components forming the battery pack.

9. The battery pack of claim 1, wherein the protection circuit comprises a protection integrated circuit adapted to determine a current flow associated with the host device.

10. A battery pack, comprising:
   at least one battery cell means coupled to electronic components forming the battery pack; and
   means for separately identifying current consumption by the electronic components and detecting an excessive current consumption condition associated with the electronic components.

11. The battery pack of claim 10, further comprising means for interrupting current flowing to the electronic components forming the battery pack in response to detecting the excessive current consumption condition.

12. The battery pack of claim 10, further comprising means for comparing a voltage potential across at least two different current sensors to detect the excessive current consumption condition.

13. The battery pack of claim 10, further comprising means for interrupting current flowing from a host device to the electronic components in response to detecting the excessive current consumption condition.

14. The battery pack of claim 10, further comprising means for interrupting current flowing from the at least one battery cell means to the electronic components in response to detecting the excessive current consumption condition.

15. A battery pack, comprising:
   a battery core pack coupled to electronic components forming the battery pack; and
   an integrated circuit adapted to compare potentials across at least two different current sensors to detect an excessive current consumption condition associated with the electronic components.

16. The battery pack of claim 15, wherein the integrated circuit is adapted to interrupt current flowing to the electronic components forming the battery pack in response to detecting the excessive current consumption condition.

17. The battery pack of claim 15, further comprising a fuse serially connected to a positive terminal of the battery core pack for interrupting current flowing from the battery core pack to the electronic components in response to detecting the excessive current consumption condition.

18. The battery pack of claim 15, further comprising a fuse serially connected to a positive terminal of the battery core pack for interrupting current flowing from a host device coupled to the battery pack to the electronic components in response to detecting the excessive current consumption condition.

19. The battery pack of claim 15, wherein at least one of the current sensors comprises a current sense resistor.

20. The battery pack of claim 19, wherein the current sense resistor is serially connected between a positive terminal of the battery pack and a recharge transistor of the battery pack.

21. The battery pack of claim 19, wherein the current sense resistor is serially connected between a negative terminal of the battery pack and a negative terminal of the battery core pack.

22. The battery pack of claim 15, wherein at least one of the current sensors is connected in series between a positive terminal of the battery pack and a positive terminal of the battery core pack.

23. The battery pack of claim 15, wherein at least one of the current sensors is connected in series between a negative terminal of the battery pack and a negative terminal of the battery core pack.

24. The battery pack of claim 15, wherein the integrated circuit is adapted to distinguish between current flow associated with a host device and current consumption associated with the electronic components forming the battery pack based on the potentials across the at least two current sensors.

25. The battery pack of claim 15, wherein the integrated circuit is adapted to determine current flow associated with a host device based on a potential across one of the at least two current sensors.

26. The battery pack of claim 15, further comprising a fuse serially connected between a positive terminal of the battery pack and a recharge transistor for interrupting current flowing from a host device to the electronic components.

27. The battery pack of claim 15, further comprising a fuse serially connected between a positive terminal of the battery core pack and a charge transistor for interrupting current flowing from the battery core pack to the electronic components.

28. The battery pack of claim 15, wherein the integrated circuit is coupled to a fuse for interrupting current flowing from a host device to the electronic components in response to detecting the excessive current consumption condition.

29. The battery pack of claim 15, wherein the integrated circuit is coupled to a fuse for interrupting current flowing from the battery core pack to the electronic components in response to detecting the excessive current consumption condition.

30. A battery pack, comprising:
   a battery core pack connected to a positive terminal of the battery pack and a negative terminal of the battery pack, the positive and negative terminals adapted to be connected to a host device; and
   a protection circuit adapted to distinguish between current consumption associated with electronic components coupled to the battery core pack and forming the battery pack and current flow associated with the host device to determine whether an excessive current consumption condition exists associated with the electronic components of the battery pack.

31. The battery pack of claim 30, wherein the protection circuit is adapted to interrupt current flowing to the electronic components of the battery pack in response to detecting the excessive current consumption condition.

32. The battery pack of claim 30, wherein the protection circuit comprises at least one integrated circuit adapted to compare voltage potentials across at least two different current sense resistors to detect the excessive current consumption condition.

33. The battery pack of claim 30, wherein the protection circuit comprises a current sensor serially connected between the positive terminal of the battery pack and a positive terminal of the battery core pack.

34. The battery pack of claim 30, wherein the protection circuit comprises a current sensor serially connected between the negative terminal of the battery pack and a negative terminal of the battery core pack.

35. The battery pack of claim 30, wherein the protection circuit comprises at least one fuse for interrupting current flowing to the electronic components forming the battery pack in response to detecting the excessive current consumption condition.

36. The battery pack of claim 30, wherein the protection circuit comprises a fuse for interrupting current flowing from the battery core pack to the electronic components in response to detecting the excessive current consumption condition.

37. The battery pack of claim 30, wherein the protection circuit comprises a fuse for interrupting current flowing from the host device to the electronic components in response to detecting the excessive current consumption condition.

38. The battery pack of claim 30, wherein the protection circuit comprises a current sensor serially connected between the positive terminal of the battery pack and a recharge transistor for determining the current flow associated with the host device.

* * * * *